(12) United States Patent
Zou et al.

(10) Patent No.: US 11,629,052 B2
(45) Date of Patent: Apr. 18, 2023

(54) SINGLE-ATOM CATALYST FOR ACTIVATION OF PERSULFATE TO GENERATE PURE SINGLET OXYGEN AS WELL AS PREPARATION METHOD AND APPLICATION THEREOF

(71) Applicant: Nanchang Hangkong University, Nanchang (CN)

(72) Inventors: Jianping Zou, Nanchang (CN); Longshuai Zhang, Nanchang (CN); Xunheng Jiang, Nanchang (CN); Zi'ai Zhong, Nanchang (CN); Feiyao Wu, Nanchang (CN); Wenjing Luo, Nanchang (CN); Shunpeng Zhu, Nanchang (CN); Ruilin Long, Nanchang (CN); Haiyan Liu, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 17/360,043

(22) Filed: Jun. 28, 2021

(65) Prior Publication Data
US 2022/0315425 A1    Oct. 6, 2022

(30) Foreign Application Priority Data
Apr. 6, 2021 (CN) .......................... 202110367516.X

(51) Int. Cl.
*B01J 23/745* (2006.01)
*B01J 27/24* (2006.01)
(Continued)

(52) U.S. Cl.
CPC ......... *C01B 13/0211* (2013.01); *B01J 23/745* (2013.01); *B01J 27/24* (2013.01);
(Continued)

(58) Field of Classification Search
CPC ....... B01J 323/745; B01J 27/24; B82Y 30/00; C01B 13/0211
See application file for complete search history.

(56) References Cited

FOREIGN PATENT DOCUMENTS

CN        110756207 A    *    2/2020

OTHER PUBLICATIONS

An et al. (High-Density Ultra-small Clusters and Single-Atom Fe Sites Embedded in Graphitic Carbon Nitride (g-C3N4) for Highly Efficient Catalytic Advanced Oxidation Processes, ACS Nano 2018, 12, 9441-9450).*

(Continued)

*Primary Examiner* — Jun Li
(74) *Attorney, Agent, or Firm* — Adam Warwick Bell

(57) ABSTRACT

The present disclosure belongs to the field of single-atom catalytic degradation of refractory organic pollutants, and provides a single-atom catalyst for activation of persulfate to generate pure singlet oxygen (1O2) as well as a preparation method and an application thereof. The single-atom catalyst of the present disclosure includes supports and single iron atoms loaded on the support; the supports are graphitic carbon nitride nanosheets; the single iron atoms are bound to the supports in the form of a Fe—N4 coordination structure. The present disclosure employs graphitic carbon nitride nanosheets as the supports, so that the single iron atoms have a uniform surrounding environment and the persulfate is only converted into 1O2 when being activated; 1O2 has good selectivity and anti-interference ability, so the single-atom catalyst provided in the present disclosure may have excellent selectivity and anti-interference performance in the degradation of organic pollutants.

10 Claims, 19 Drawing Sheets

(51) Int. Cl.
  *B01J 35/02* (2006.01)
  *B01J 37/00* (2006.01)
  *C01B 13/02* (2006.01)
  *B82Y 30/00* (2011.01)

(52) U.S. Cl.
  CPC ......... *B01J 35/023* (2013.01); *B01J 37/0018* (2013.01); *B82Y 30/00* (2013.01)

(56) References Cited

OTHER PUBLICATIONS

Lin (Graphitic carbon nitride-supported iron oxides: High-performance photocatalysts for the visible-light-driven degradation of 4-nitrophenol, Journal of Photochemistry and Photobiology A: Chemistry 336 (2017) 105-114).*
Machine translation of CN110756207A, publication date Feb. 7, 2020.*
Liu et al, Supported single-atom catalysts: synthesis, characterization, properties, and applications, Environ Chem Lett (2018) 16: 477-505.*
Chen et al. Single-atom heterogeneous catalysts based on distinct carbon nitride scaffolds, National Science Review 5: 642-652, 2018.*

\* cited by examiner

SINGLE-ATOM CATALYST FOR ACTIVATION OF PERSULFATE TO GENERATE PURE SINGLET OXYGEN AS WELL AS PREPARATION METHOD AND APPLICATION THEREOF

TECHNICAL FIELD

The present disclosure relates to the field of single-atom catalytic degradation of refractory organic pollutants, and specifically relates to a single-atom catalyst for activation of persulfate to generate pure singlet oxygen as well as a preparation method and an application thereof.

BACKGROUND ART

In recent years, single-atom catalysts (SACs) with the advantages of high activity, high atom utilization and high selectivity have been extensively applied in the energy, chemical and other fields, providing new thoughts for high-efficiency energy conversion and catalysis of organic reactions. In addition, the advantages of SACs have attracted more and more attention in environmental remediation. Where, in terms of single-atom catalysis in advanced oxidation processes (AOP), SACs, such as Mn, Fe, Co and the like, can efficiently activate peroxymonosulfate (PMS), peroxydisulfate (PDS) and $H_2O_2$, thus achieving high-efficiency degradation of refractory organic pollutants in water. However, the supports of SACs mainly include defect-rich nitrogen-doped carbon materials, in which nitrogen has various forms, complex defects and low content, resulting in the inhomogeneity of active sites in SACs. As a result, there is commonly a coexistence of free radical (hydroxyl radicals (.OH), sulfate radicals ($.SO_4^-$), superoxide radicals ($.O_2^-$), etc.) and non-free radical (singlet oxygen ($^1O_2$), etc.) active species of SACs in AOP, making them have the drawbacks of poor selectivity and poor anti-interference ability to environmental media in the degradation of organic pollutants.

SUMMARY

In view of this, the present disclosure is intended to provide a single-atom catalyst (SAC) for activation of persulfate to generate pure singlet oxygen ($^1O_2$) as well as a preparation method and an application thereof. The SAC provided in the present disclosure has high selectivity and strong ability to resist environmental interference in the degradation of organic pollutants.

In order to achieve the above objectives, the present disclosure provides the following technical schemes:

The present disclosure provides a single-atom catalyst for activation of persulfate to generate pure singlet oxygen, including supports and single iron atoms loaded on the supports; the supports are graphitic carbon nitride nanosheets; the single iron atoms are bound to the supports in the form of a Fe—$N_4$ coordination structure; the mass of the single iron atoms is 7-12% the mass of the single-atom catalyst.

Preferably, the mass of the single iron atoms is 7-8% the mass of the single-atom catalyst.

The present disclosure also provides a preparation method of the single-atom catalyst for activation of persulfate to generate pure singlet oxygen as described in the above technical scheme, including the following steps:

Organic acid ligands, soluble iron salts and water are mixed for a complexing reaction, to get a solution of iron-organic complexes;

The solution of iron-organic complexes, cyanuric acid and cyanamide compounds are mixed for a self-assembly reaction to get precursors;

The precursors are pyrolyzed, to get the single-atom catalyst for activation of persulfate to generate pure singlet oxygen.

Preferably, the organic acid ligands include one or more of oxalic acid, ethylenediamine tetraacetic acid and citric acid.

Preferably, the mass ratio of the organic acid ligands to the soluble iron salts is (0.2-1.0):(0.05-1.0).

Preferably, the cyanamide compounds include melamine and/or dicyandiamide.

Preferably, the sum of the amount of carboxyl groups in the organic acid ligands and the amount of hydroxyl groups in cyanuric acid equals to the amount of amino groups in the cyanamide compounds.

Preferably, the temperature of pyrolysis is 500-900° C., the time of pyrolysis is 2-8 h, and the pyrolysis is carried out in a protective atmosphere.

The present disclosure also provides an application of the single-atom catalyst for activation of persulfate to generate pure singlet oxygen as described in the above technical scheme or the single-atom catalyst for activation of persulfate to generate pure singlet oxygen obtained by the preparation method as described in the above technical scheme in the catalytic degradation of organic pollutants.

Preferably, the application includes the following steps:

The single-atom catalyst for activation of persulfate to generate pure singlet oxygen, persulfate and organic pollutants to be treated are mixed for degradation.

The present disclosure provides a single-atom catalyst (SAC) for activation of persulfate to generate pure $^1O_2$, which includes supports and single iron atoms loaded on the supports; the supports are graphitic carbon nitride nanosheets; the single iron atoms are bound to the supports in the form of a Fe—$N_4$ coordination structure; the mass of the single iron atoms is 7-12% the mass of the single-atom catalyst. The present disclosure employs graphitic carbon nitride nanosheets as the supports, in which nitrogen atoms have fixed sites in the graphitic carbon nitride nanosheets, so that the single iron atoms have a uniform surrounding environment and the persulfate is only converted into $^1O_2$ when being activated; $^1O_2$ has good selectivity and anti-interference ability, so the SAC provided in the present disclosure may have excellent selectivity and anti-interference performance in the degradation of organic pollutants. Meanwhile, the mass of single iron atoms in the single-atom catalyst is 7-12% the mass of the single-atom catalyst, improving the efficiency of activation of persulfate by the single-atom catalyst.

The present disclosure also provides a preparation method of the SAC for activation of persulfate to generate pure $^1O_2$ as described in the above technical scheme, which includes the following steps: organic acid ligands, soluble iron salts and water are mixed for a complexing reaction, to get a solution of iron-organic complexes; the solution of iron-organic complexes, cyanuric acid and cyanamide compounds are mixed for a self-assembly reaction to get precursors; the precursors are pyrolyzed, to get the SAC for activation of persulfate to generate pure $^1O_2$. The preparation method of the present disclosure can be used to prepare SACs successfully, and the preparation method has advantages of simple operation, wide raw material sources, and low production cost.

DETAILED DESCRIPTION OF THE EMBODIMENTS

Figure 1:
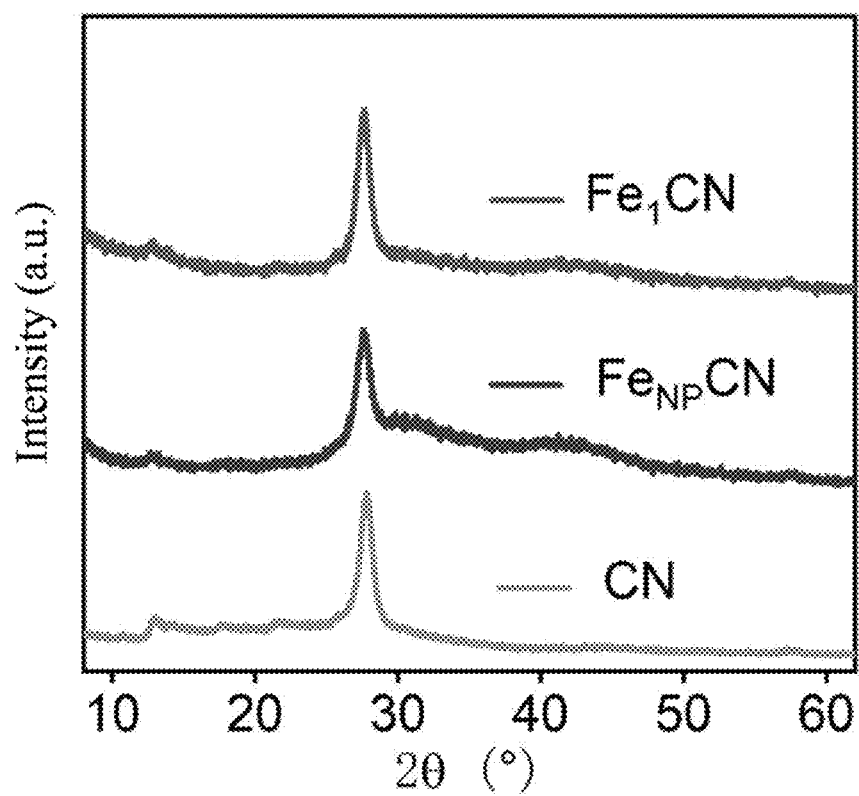
FIG. 1 shows XRD patterns of 7.0% $Fe_1CN$ ($Fe_1CN$) obtained in embodiment 1, 7.0% $Fe_{NP}CN$ ($Fe_{NP}CN$) obtained in comparative embodiment 1 and CN obtained in comparative embodiment 2.

The present disclosure provides a single-atom catalyst (SAC) for activation of persulfate to generate pure $^1O_2$, including supports and single iron atoms loaded on the supports; the supports are graphitic carbon nitride nanosheets; the single iron atoms are bound to the supports in the form of a Fe—$N_4$ coordination structure; the mass of the single iron atoms is 7-12% the mass of the single-atom catalyst.

The SAC for activation of persulfate to generate pure $^1O_2$ provided in the present disclosure includes supports, and the supports are graphitic carbon nitride nanosheets. In the present disclosure, the thickness of the graphitic carbon nitride nanosheets is preferably 5-15 nm.

The SAC for activation of persulfate to generate pure $^1O_2$ provided in the present disclosure includes single iron atoms loaded on the supports; the single iron atoms are bound to the supports in the form of a Fe—$N_4$ coordination structure; the mass of the single iron atoms is 7-12% the mass of the single-atom catalyst, further preferably 7-8% the mass of the single-atom catalyst, and more preferably 7% the mass of the single-atom catalyst. In the present disclosure, the single iron atoms are distributed within and on the surface of the supports.

The present disclosure also provides a preparation method of the SAC for activation of persulfate to generate pure $^1O_2$ as described in the above technical scheme, including the following steps:

Organic acid ligands, soluble iron salts and water are mixed for a complexing reaction, to get a solution of iron-organic complexes;

The solution of iron-organic complexes, cyanuric acid and cyanamide compounds are mixed for a self-assembly reaction to get precursors;

The precursors are pyrolyzed, to get the SAC for activation of persulfate to generate pure $^1O_2$.

In the present disclosure, unless otherwise specified, the raw materials used in the present disclosure are preferably commercially available products.

In the present disclosure, organic acid ligands, soluble iron salts and water are mixed for a complexing reaction, to get a solution of iron-organic complexes.

In the present disclosure, the organic acid ligands preferably include one or more of oxalic acid, ethylenediamine tetraacetic acid and citric acid, further preferably oxalic acid or citric acid. In the present disclosure, the soluble iron salts preferably include soluble ferrous salts or soluble ferric salts; the soluble ferrous salts preferably include one or more of ferrous sulfate, ferrous chloride and ferrous nitrate; the soluble ferric salts preferably include one or more of ferric nitrate, ferric chloride and ferric sulfate. In the present disclosure, the water is preferably deionized water.

In the present disclosure, the mass ratio of the organic acid ligands to the soluble iron salts is preferably (0.2-1.0):(0.05-1.0), further preferably 0.643:(0.288-0.576), more preferably 0.643:0.288, in particular preferably 0.643:0.288, 0.643:0.432 or 0.643:0.576. In the present disclosure, the mass ratio of the organic acid ligands to water is preferably (0.2-1.0):(10-100), further preferably 0.643:50.

In the present disclosure, the mixing order of the organic acid ligands, the soluble iron salts and water is preferably as below: organic acid ligands is firstly mixed with water to get a solution of organic acid ligands; and the solution of organic acid ligands is then mixed with the soluble iron salts.

In the present disclosure, the temperature of the complexing reaction is preferably room temperature, that is, no additional cooling or heating is required; the time of the complexing reaction is preferably 5-30 min, further preferably 10 min. In the present disclosure, the complexing reaction is preferably carried out with stirring.

In the present disclosure, the soluble iron salts complex with the organic acid ligands to form iron-organic complexes.

After obtaining the solution of iron-organic complexes, it is mixed with cyanuric acid and cyanamide compounds for a self-assembly reaction to get precursors.

In the present disclosure, the cyanuric acid is preferably used in the form of an aqueous solution of cyanuric acid. In the aqueous solution of cyanuric acid, the mass ratio of cyanuric acid to water is preferably (1-5):(200-1000), further preferably 2.46:350; the aqueous solution of cyanuric acid is preferably formulated by mixing cyanuric acid with water at 60-80° C.

In the present disclosure, the cyanamide compounds preferably include melamine and/or dicyandiamide, further preferably melamine. In the present disclosure, the cyanamide compounds are preferably used in the form of an aqueous solution of cyanamide compounds. In the aqueous solution of cyanamide compounds, the mass ratio of cyanamide compounds to water is preferably (1-5):(200-1000), further preferably 3:350; the aqueous solution of cyanamide compounds is preferably formulated by mixing cyanamide compounds with water at 60-80° C.

In the present disclosure, the sum of the amount of carboxyl groups in the organic acid ligands and the amount of hydroxyl groups in cyanuric acid equals to the amount of amino groups in the cyanamide compounds.

In the present disclosure, the mass ratio of the soluble iron salts, cyanuric acid and cyanamide compounds is preferably (0.05-1.0):(1-5):(1-5), further preferably (0.288-0.576): 2.46:3, more preferably 0.288:2.46:3.

In the present disclosure, the mixing order of the solution of iron-organic complexes, cyanuric acid and cyanamide compounds is preferably as below: the solution of iron-organic complexes is firstly mixed with cyanuric acid, and then mixed with cyanamide compounds.

In the present disclosure, the temperature of the self-assembly reaction is preferably room temperature, that is, no additional cooling or heating is required; the time of the self-assembly reaction is preferably 1-6 h, further preferably 4 h. In the present disclosure, the self-assembly reaction is preferably carried out with stirring.

At the end of the self-assembly reaction, the present disclosure preferably further includes solid-liquid separation of the resulting material liquor of the self-assembly reaction, and the resulting precipitates are washed and dried to get the precursors.

In the present disclosure, the solid-liquid separation is preferably by means of filtration. In the present disclosure, the washing reagent is preferably water. The present disclosure has no specific limitation on the times of washing and the amount of the washing reagent, as long as cleaning the resulting precipitates. In the present disclosure, the temperature of drying is preferably 60-90° C., in particular preferably 90° C.; and the time of drying is preferably 2-8 h, further preferably 3 h.

In the present disclosure, during the self-assembly, supermolecules are formed by the self-assembly of the iron-organic complexes and cyanuric acid with cyanamide compounds through hydrogen bonds, thus realizing the fixation of Fe ions. During the subsequent pyrolysis, Fe atoms are loaded onto the supports more uniformly. Meanwhile, the fixed nitrogen sites in the graphitic carbon nitride supports generated from the pyrolysis keep the single atomic sites uniform, thereby obtaining the SACs for activation of persulfate to generate pure $^1O_2$.

After obtaining the precursors, they are pyrolyzed to get the single-atom catalyst for activation of persulfate to generate pure singlet oxygen.

In the present disclosure, the temperature of pyrolysis is preferably 500-900° C., further preferably 600-800° C., in particular preferably 600° C.; the heating rate from room temperature to the temperature of pyrolysis is preferably 2-10° C./min, further preferably 5-8° C./min, in particular preferably 5° C./min; the time of pyrolysis is preferably 2-8 h, further preferably 4 h. In the present disclosure, the pyrolysis is preferably carried out in a protective atmosphere. The protective atmosphere preferably includes argon or nitrogen, further preferably argon. In the present disclosure, the pyrolysis is preferably carried out in a tube furnace.

In the present disclosure, pyrolysis allows the formation of graphitic carbon nitride nanosheets from supermolecular precursors, and meanwhile converts iron ions into their single atomic state.

The present disclosure also provides an application of the SACs for activation of persulfate to generate pure $^1O_2$ as described in the above technical scheme or the SACs for activation of persulfate to generate pure $^1O_2$ obtained by the preparation method as described in the above technical scheme in the catalytic degradation of organic pollutants.

In the present disclosure, the application preferably includes the following steps:

The SACs for activation of persulfate to generate pure $^1O_2$, persulfate and organic pollutants to be treated are mixed for degradation.

In the present disclosure, the organic pollutants to be treated are preferably one or more of p-chlorophenol, phenol, bisphenol A and sulfamethoxazole. In the present disclosure, the persulfate preferably includes peroxymonosulfate (PMS) or peroxydisulfate (PDS).

In the present disclosure, the mass ratio of $Fe_1CN$ for activation of persulfate to generate pure $^1O_2$ to persulfate is preferably (5-50):(1-50), further preferably (20-30):(12-24). In the present disclosure, the mass ratio of $Fe_1CN$ for activation of persulfate to generate pure $^1O_2$ to the organic pollutants to be treated is preferably (20-30):(2-6).

In the present disclosure, the temperature of degradation is preferably room temperature, that is, no additional heating or cooling is required; and the time of degradation is preferably 5-10 min.

The SACs for activation of persulfate to generate pure $^1O_2$ as well as its preparation method and application as provided in the present disclosure will be illustrated in detail in combination with the following embodiments, but they should not be construed as the limitation on the protection scope of the present disclosure.

Embodiment 1

(1) 643 mg oxalic acid was weighed and dissolved in 50 mL deionized water to get a solution A;

(2) 288 mg ferric nitrate was weighed and added into the solution A with stirring for 10 min to get a solution B;

(3) 2.46 g cyanuric acid and 3 g melamine were respectively weighed, and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get SACs, which were tested by ICP-AES as below: the content of Fe in the resulting SACs was 7.0% the mass of the SACs, marked as 7.0% $Fe_1CN$.

Embodiment 2

(1) 643 mg oxalic acid was weighed and dissolved in 50 mL deionized water to get a solution A;

(2) 432 mg ferric nitrate was weighed and added into the solution A with stirring for 10 min to get a solution B;

(3) 2.46 g cyanuric acid and 3 g melamine were respectively weighed, and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get SACs, which were tested by ICP-AES as below: the content of Fe in the resulting SACs was 8.0% the mass of the SACs, marked as 8.0% $Fe_1CN$.

Embodiment 3

(1) 643 mg oxalic acid was weighed and dissolved in 50 mL deionized water to get a solution A;

(2) 576 mg ferric nitrate was weighed and added into the solution A with stirring for 10 min to get a solution B;

(3) 2.46 g cyanuric acid and 3 g melamine were respectively weighed, and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get SACs, which were tested by ICP-AES as below: the content of Fe in the resulting SACs was 11.2% the mass of the SACs, marked as 11.2% $Fe_1CN$.

Comparative Embodiment 1

(1) 334 mg hydroxylamine hydrochloride was weighed and dissolved in 50 mL deionized water to get a solution A;

(2) 167 mg ferrous sulfate was weighed and added into the solution A with stirring for 10 min to get a solution B;

(3) 2.46 g cyanuric acid and 3 g melamine were respectively weighed, and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get Fe nanoparticle catalysts, which were tested by ICP-AES as below: the content of Fe in the resulting catalysts was 7.0% the mass of the catalysts, marked as 7.0% $Fe_{NP}CN$.

Comparative Embodiment 2

(1) 3 g cyanuric acid and 3 g melamine were respectively weighed and dissolved in 350 mL deionized water by heating at 80° C. to get solutions A and B;

(2) The solutions A and B were mixed with stirring for 4 h and then filtered, the resulting precipitates were washed with water and dried at 90° C. for 3 h to get precursors;

(3) The precursors obtained from (2) were heated to 600° C. at a rate of 5° C./min in a tube furnace under the protection of an argon atmosphere and hold for 4 h to get the CN catalysts.

Comparative Embodiment 3

(1) 643 mg oxalic acid was weighed and dissolved in 50 mL deionized water to get a solution A;

(2) 57 mg ferric nitrate was weighed and added into the solution A with stirring for 10 min to get a solution B;

(3) 2.46 g cyanuric acid and 3 g melamine were respectively weighed and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get SACs, which were tested by ICP-AES as below: the content of Fe in the resulting SACs was 1.7% the mass of the SACs, marked as 1.7% $Fe_1CN$.

Comparative Embodiment 4

(1) 643 mg oxalic acid was weighed and dissolved in 50 mL deionized water to get a solution A;

(2) 144 mg ferric nitrate was weighed and added into the solution A with stirring for 10 min to get a solution B;

(3) 2.46 g cyanuric acid and 3 g melamine were respectively weighed, and dissolved in 350 mL deionized water by heating at 80° C. to get solutions C and D;

(4) The solutions B and C were mixed to get a solution E;

(5) The solution D was mixed with the solution E with stirring for 4 h and then filtered, the resulting precipitates were washed with water and dried at 90° C. for 3 h to get precursors;

(6) The precursors obtained from (5) were heated to 600° C. at a rate of 5° C./min in a tube furnace under the protection of an argon atmosphere and hold for 4 h to get SACs, which were tested by ICP-AES as below: the content of Fe in the resulting SACs was 6.0% the mass of the SACs, marked as 6.0% $Fe_1CN$.

Figure 2:
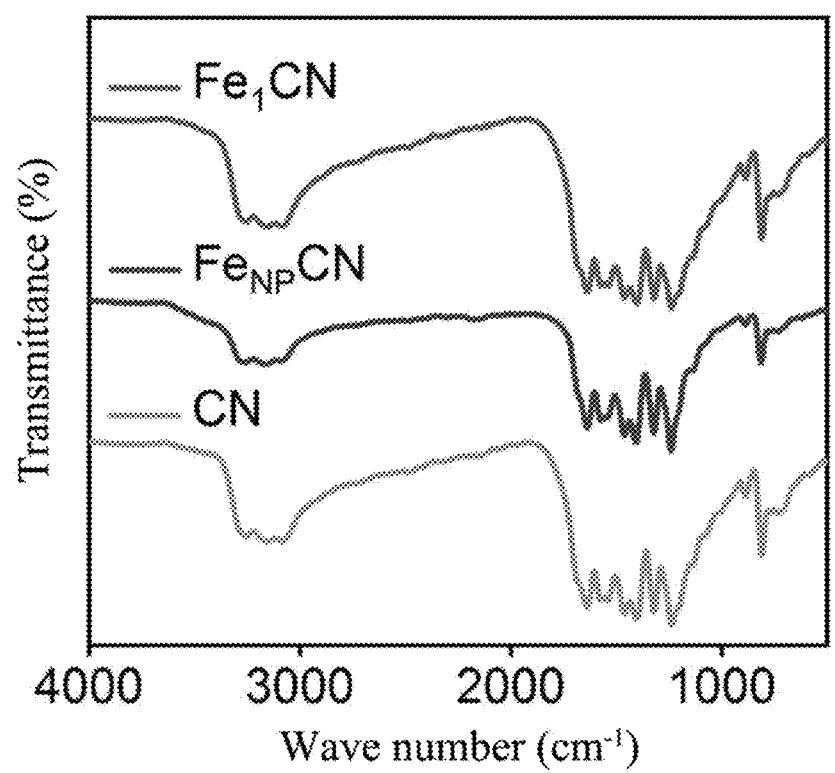
FIG. 2 shows FT-IR spectra of 7.0% $Fe_1CN$ ($Fe_1CN$) obtained in embodiment 1, 7.0% $Fe_{NP}CN$ ($Fe_{NP}CN$) obtained in comparative embodiment 1 and CN obtained in comparative embodiment 2.

FIG. 1 shows XRD patterns of 7.0% $Fe_1CN$ ($Fe_1CN$) obtained in embodiment 1, 7.0% $Fe_{NP}CN$ ($Fe_{NP}CN$) obtained in comparative embodiment 1 and CN obtained in comparative embodiment 2; FIG. 2 shows FT-IR spectra of 7.0% $Fe_1CN$ ($Fe_1CN$) obtained in embodiment 1, 7.0% $Fe_{NP}CN$ ($Fe_{NP}CN$) obtained in comparative embodiment 1 and CN obtained in comparative embodiment 2. As can be seen from FIG. 1 and FIG. 2: (100) and (002) crystal plane diffraction characteristic peaks of graphitic carbon nitride (CN) occurred at 13.1° and 27.8° for the single-atom catalyst prepared in embodiment 1; characteristic absorption peaks corresponding to C—N heterocyclic stretching vibration and aromatic stretching vibration modes occurred at 1638 cm$^{-1}$, 1570 cm$^{-1}$, 1247 cm$^{-1}$ and 1410 cm$^{-1}$ in FT-IR. The results showed that: the support for 7.0% $Fe_1CN$ was CN.

Figure 3:
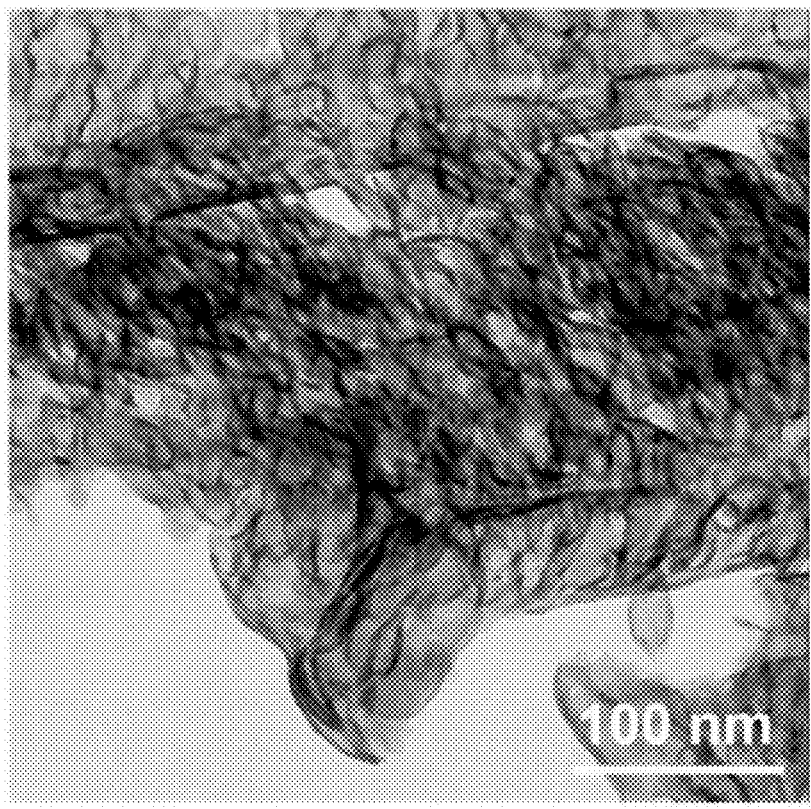
FIG. 3 shows the TEM image of 7.0% $Fe_1CN$ obtained in embodiment 1.
Figure 4:
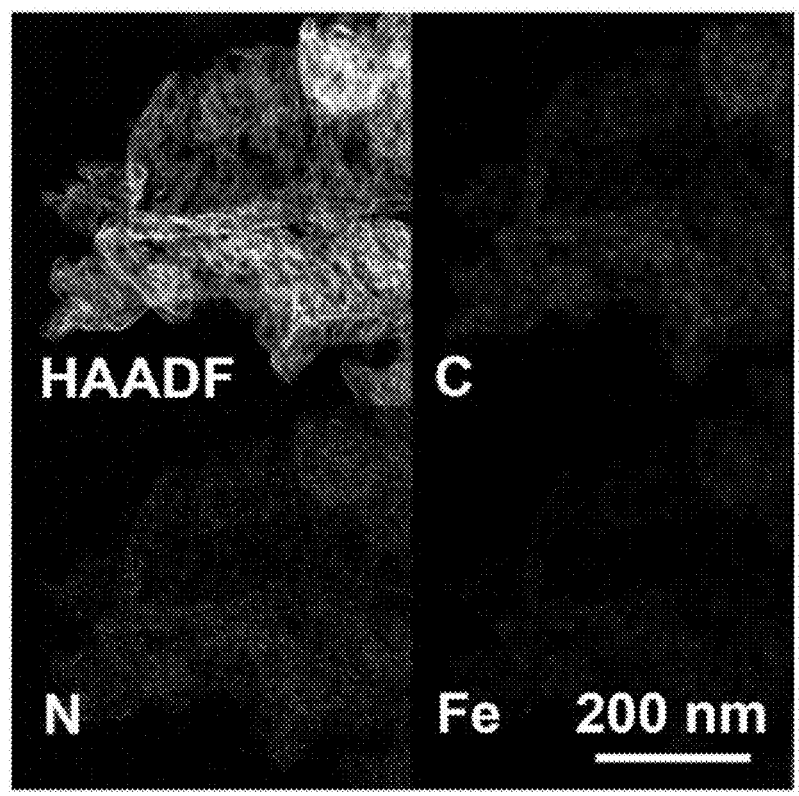
FIG. 4 shows the element distribution images of 7.0% $Fe_1CN$ obtained in embodiment 1.

FIG. 3 shows the TEM image of 7.0% $Fe_1CN$ obtained in embodiment 1; FIG. 4 shows the element distribution image of 7.0% $Fe_1CN$ obtained in embodiment 1. As can be seen from FIGS. 3 and 4: no Fe nanoparticles or clusters were observed in transmission electron microscopy, indicating that Fe was distributed in CN uniformly.

Figure 5:
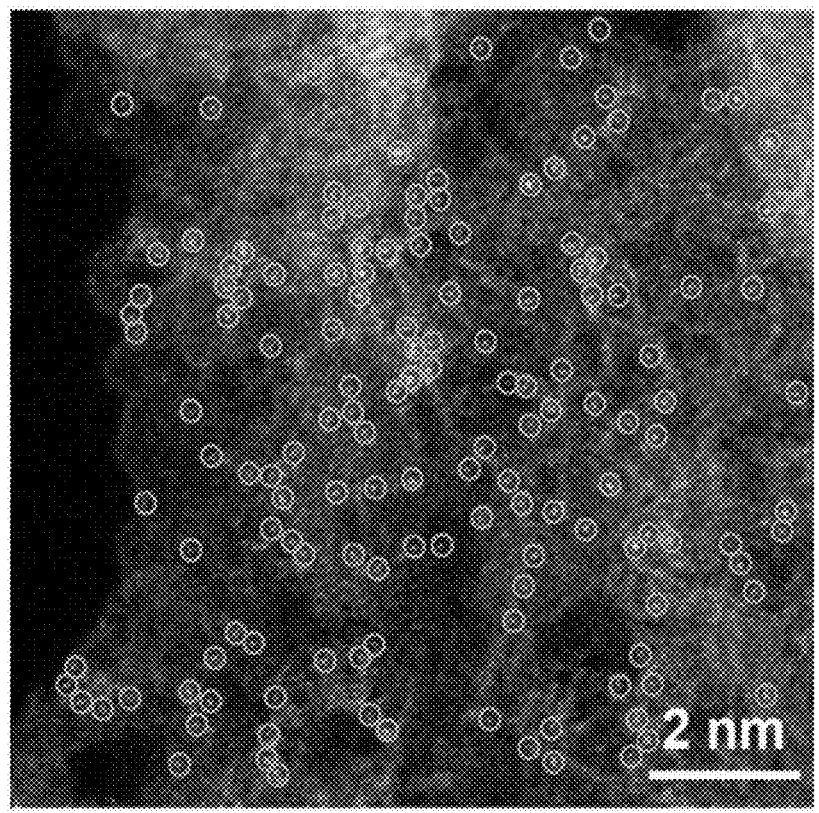
FIG. 5 shows the AC-HAADF-STEM image of 7.0% $Fe_1CN$ obtained in embodiment 1.
Figure 6:
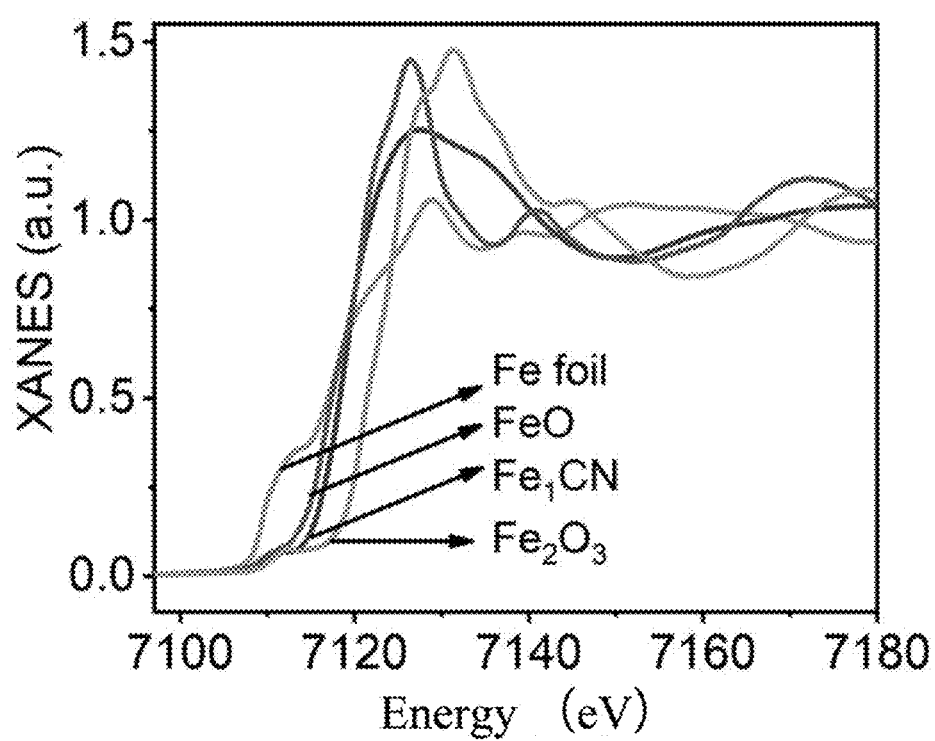
FIG. 6 shows the XANES spectra of 7.0% $Fe_1CN$ obtained in embodiment 1.
Figure 7:
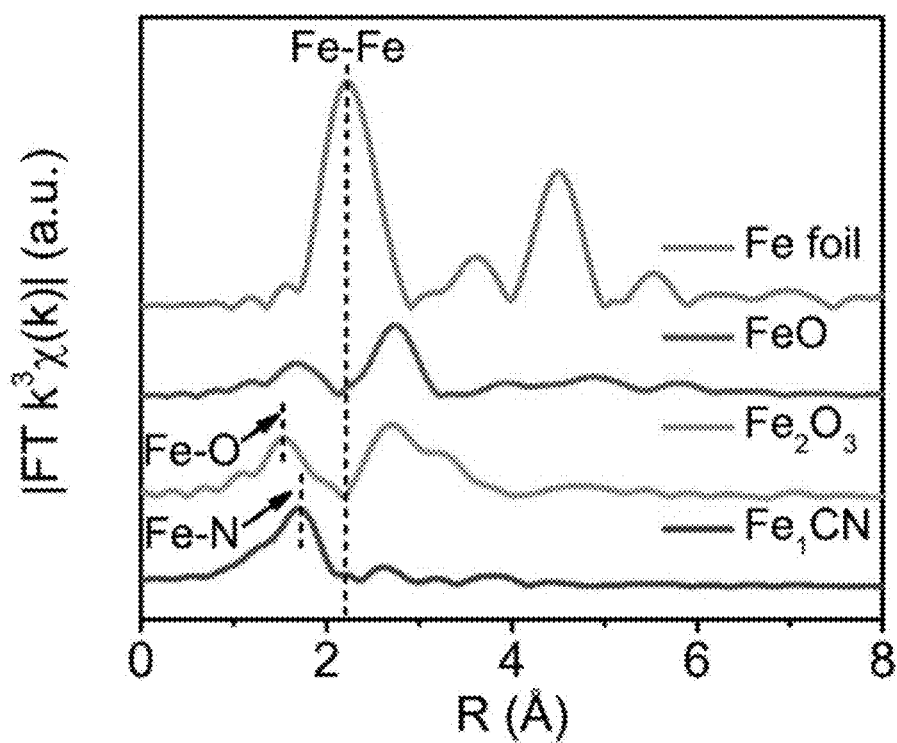
FIG. 7 shows the EXAFS spectra of 7.0% $Fe_1CN$ obtained in embodiment 1.

FIG. 5 shows the AC-HAADF-STEM image of 7.0% $Fe_1CN$ obtained in embodiment 1; FIG. 6 shows the XANES spectra of 7.0% $Fe_1CN$ obtained in embodiment 1; and FIG. 7 shows the EXAFS spectra of 7.0% $Fe_1CN$ obtained in embodiment 1. As can be seen from FIG. 5: Fe (marked in circles) was distributed in CN uniformly in a form of single atoms. As shown in FIG. 6: the proximal edge of 7.0% $Fe_1CN$ was located between FeO and $Fe_2O_3$ baselines, indicating that the valence state of Fe in 7.0% $Fe_1CN$ was between $Fe^{2+}$ and $Fe^{3+}$, this was caused by the strong interaction between Fe atoms and graphitic carbon nitride. In addition, in order to get an accurate Fe single-atom coordination environment, a fitting analysis was performed on the EXAFS of 7.0% $Fe_1CN$ (FIG. 7), from which it can be known that Fe was coordinated with N with a coordination number of 4, thereby confirming that Fe single atom was in a $Fe-N_4$ coordination structure.

Figure 8:
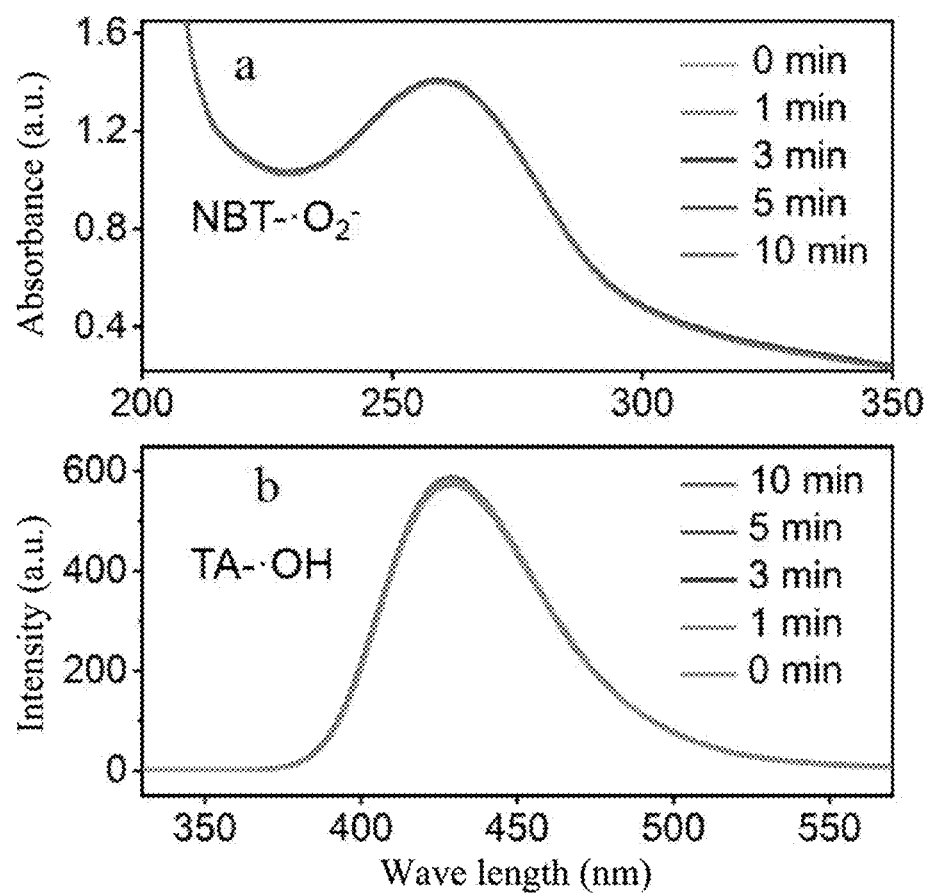
FIG. 8 shows the ultra-violet absorption spectra and the fluorescence spectra of an activation solution obtained by activating PMS with 7.0% $Fe_1CN$ obtained in embodiment 1, in which: a shows the ultra-violet absorption spectra of an activation solution obtained with nitroblue tetrazolium (NBT) as the probe for $.O_2^-$, b shows the fluorescence spectra of an activation solution obtained with terephthalic acid (TA) as the probe for .OH.

25 mL PMS at 2 mM was activated with 25 mL dispersion liquid of 7.0% $Fe_1CN$ (obtained in embodiment 1) at 1.0 g/L. The resulting activation solution was tested for UV-Vis absorption and fluorescence intensity, with the results as shown in FIG. 8, in which: a showed the ultra-violet absorption spectra of the activation solution obtained with nitroblue tetrazolium (NBT) as the probe for $.O_2^-$, b showed the fluorescence spectra of the activation solution obtained with terephthalic acid (TA) as the probe for .OH. As can be seen from FIG. 8: with the increase of reaction time, the absorbance at 259 nm and the fluorescence intensity at 425 nm of the activation solution remained unchanged, indicating that the activation of PMS with $Fe_1CN$ would not generate .OH and $.O_2^-$.

Figure 9:
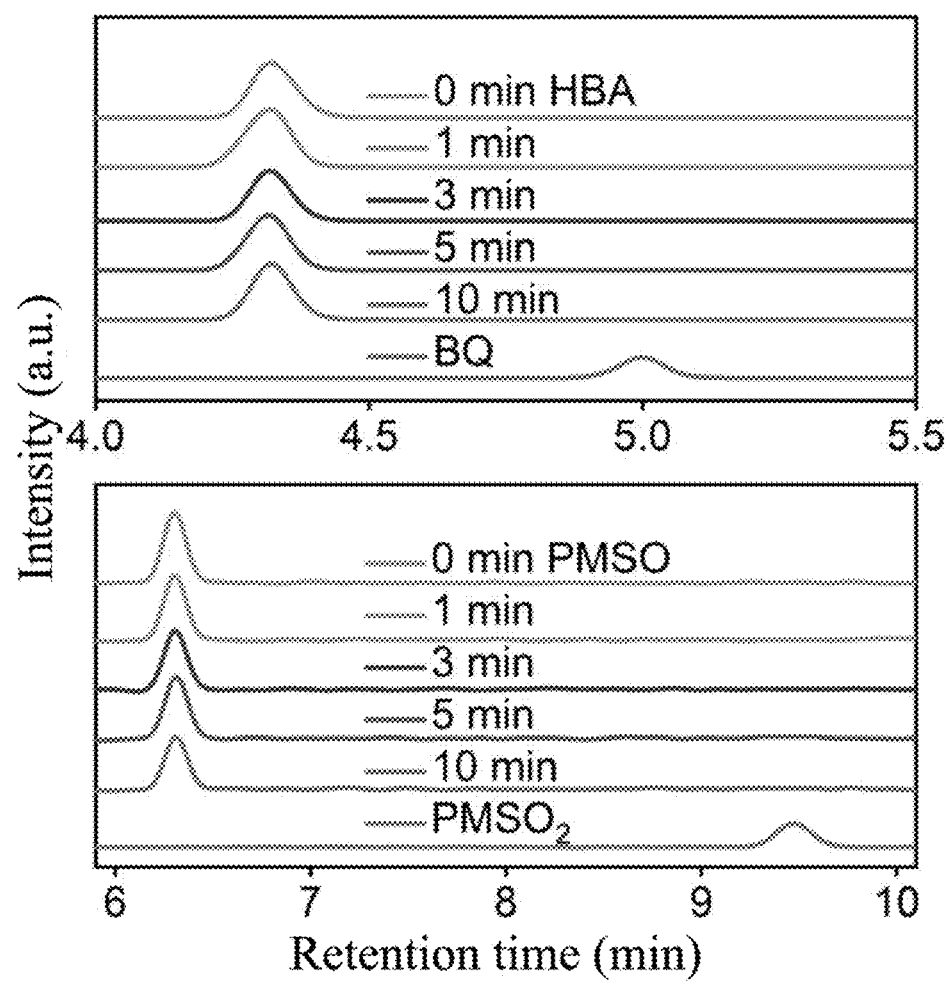
FIG. 9 shows the qualitative and quantitative test charts of $.SO_4^-$ and Fe (IV) in the activation solution obtained by activating PMS with 7.0% $Fe_1CN$ obtained in embodiment 1, with p-hydroxybenzoic acid (HBA) and methyl phenyl sulfoxide (PMSO) as the probes for $.SO_4^-$ and Fe (IV), respectively.

With p-hydroxybenzoic acid (HBA) and methyl phenyl sulfoxide (PMSO) as the probes for .SO4- and Fe (IV) respectively, .SO4- and Fe (IV) in the activation solution obtained by activating PMS with 7.0% Fe1CN obtained in embodiment 1 were tested qualitatively and quantitatively, with the results as shown in FIG. 9. As can be seen from FIG. 9: there were still no p-benzoquinone (BQ) and methyl phenyl sulfone (PMSO2) generated 10 min after the reaction between 7.0% Fe1CN and the PMS system, indicating that the activation of PMS with 7.0% Fe1CN did not generate active substances including .SO4- and Fe (IV).

Figure 10:
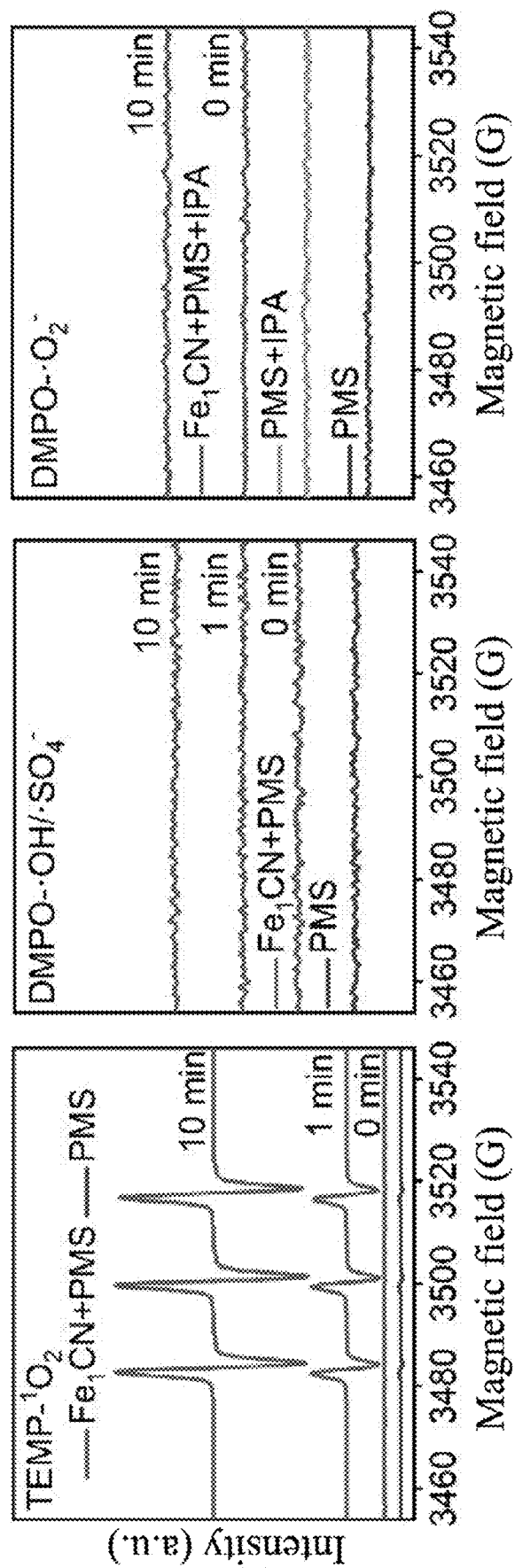
FIG. 10 shows the EPR spectra of the activation solution obtained by activating PMS with 7.0% $Fe_1CN$ obtained in embodiment 1, with 2,2,6,6-tetramethylpiperidine (TEMP) as the probe for $^1O_2$, and with 5,5-dimethyl-1-pyrroline-N-oxide (DMPO) as the probes for .OH, $.SO_4^-$ and $.O_2^-$.

With 2,2,6,6-tetramethylpiperidine (TEMP) as the probe for $^1O_2$, and with 5,5-dimethyl-1-pyrroline-N-oxide (DMPO) as the probes for .OH, $.SO_4^-$ and $.O_2^-$, the activation solution obtained by activating PMS with 7.0% $Fe_1CN$ obtained in embodiment 1 was tested by EPR, with the results as shown in FIG. 10. As can be seen from FIG. 10: a characteristic peak of $^1O_2$ occurred in the activation of PMS with 7.0% $Fe_1CN$, and it increased with time, indicating that the activation of PMS generated a large amount of $^1O_2$. However, when 5,5-dimethyl-1-pyrroline-N-oxide (DMPO) was used as the probes for .OH, $.SO_4^-$ and $.O_2^-$, no characteristic peaks of .OH and $.SO_4^-$ were detected. In addition, when an excessive amount of isopropyl alcohol (IPA) was added to quench .OH and $.SO_4^-$, there were still no characteristic signals of $.O_2^-$ occurred in the EPR spectrum, indicating that the activation of PMS with $Fe_1CN$ would not generate $.O_2^-$. The above results showed that the activation of PMS with 7.0% $Fe_1CN$ generated pure $^1O_2$.

Figure 11:
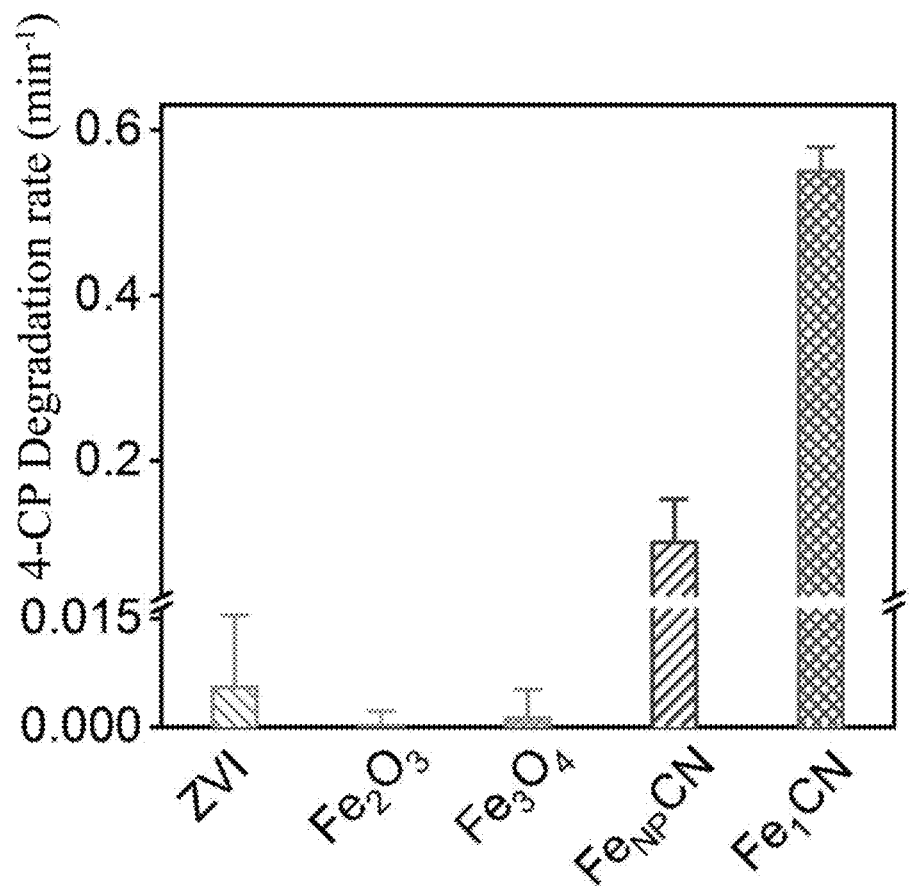
FIG. 11 is a diagram showing the degradation rate of 4-CP in the activation of PMS with 7.0% $Fe_1CN$ obtained in embodiment 1.
Figure 12:
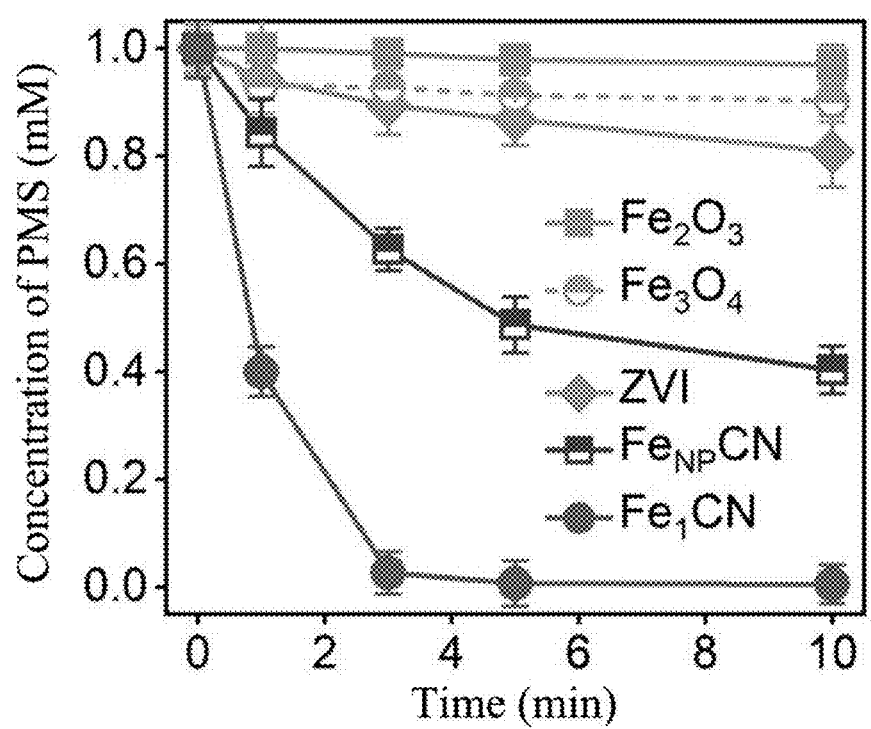
FIG. 12 is a diagram showing the content of PMS in the solution when 4-CP is degraded during the activation of PMS with 7.0% $Fe_1CN$ obtained in embodiment 1.
Figure 13:
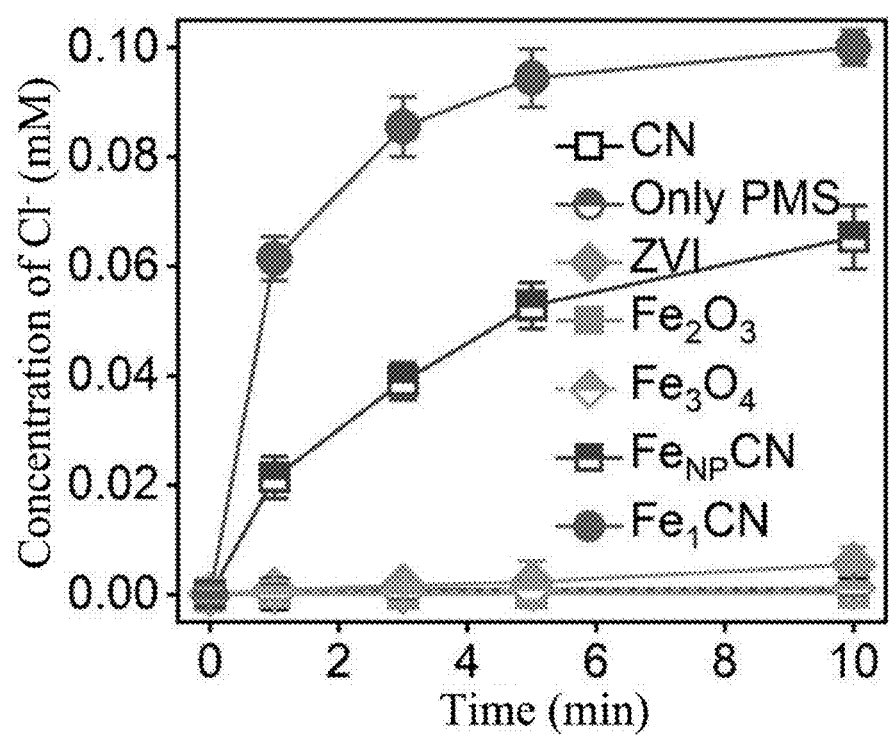
FIG. 13 is a diagram showing the concentration changes of chloride ions in the solution when 4-CP is degraded during the activation of PMS with 7.0% $Fe_1CN$ obtained in embodiment 1.

FIG. 11 is a diagram showing the degradation rate of 4-CP in the activation of PMS with 7.0% $Fe_1CN$ obtained in embodiment 1. As shown in FIG. 11: compared with 7.0% $Fe_{NP}CN$ (in the figure, $Fe_{NP}CN$), commercialized ZVI, $Fe_2O_3$ and $Fe_3O_4$, the kinetic rate of degradation of p-chlorophenol by 7.0% $Fe_1CN$ was 0.55 min$^{-1}$, which was 5.4 times that of 7.0% $Fe_{NP}CN$, 100 times that of ZVI, and 450 times that of $Fe_3O_4$ respectively, showing that 7.0% $Fe_1CN$ had ultrahigh catalytic degradation efficiency. In addition, the consumption rate of PMS in the solution was shown in FIG. 12. As can be seen from FIG. 12: the consumption rate of PMS was more rapid, indicating that there was no un-activated PMS in the solution, and further confirming that the activation of PMS with 7.0% $Fe_1CN$ generated highly efficient oxygen-containing active substances, thus achieving the rapid degradation of 4-CP. FIG. 13 is a diagram showing the concentration changes of chloride ions in the solution when 4-CP is degraded during the activation of PMS with 7.0% $Fe_1CN$ obtained in embodiment 1. As can be seen from FIG. 13: the dechlorination rate of 7.0% $Fe_1CN$ reached 100% within 10 min. The above results showed that: the activation of PMS with 7.0% $Fe_1CN$ degraded 4-CP efficiently and realized rapid dechlorination, thereby achieving effective detoxification.

Figure 14:
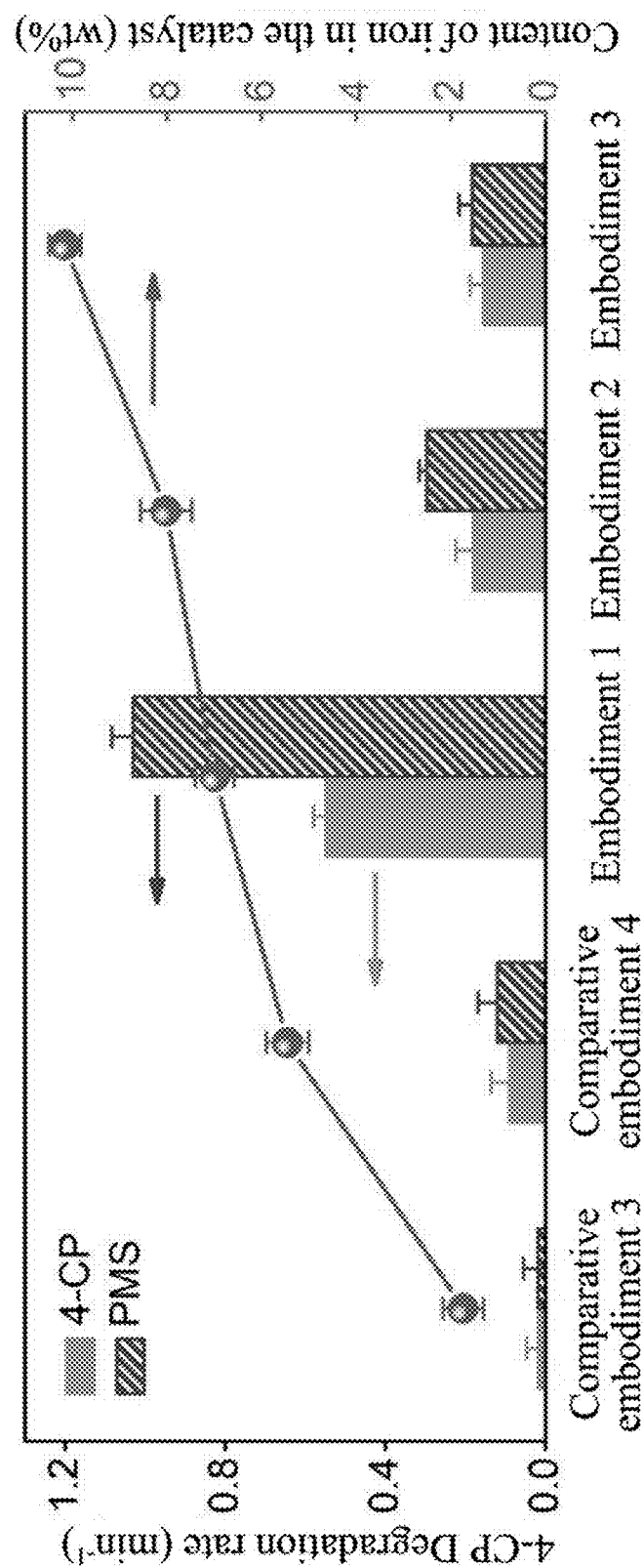
FIG. 14 is a diagram showing the degradation rate of 4-CP and the consumption rate of PMS under different SACs prepared in the present disclosure.
Figure 15:
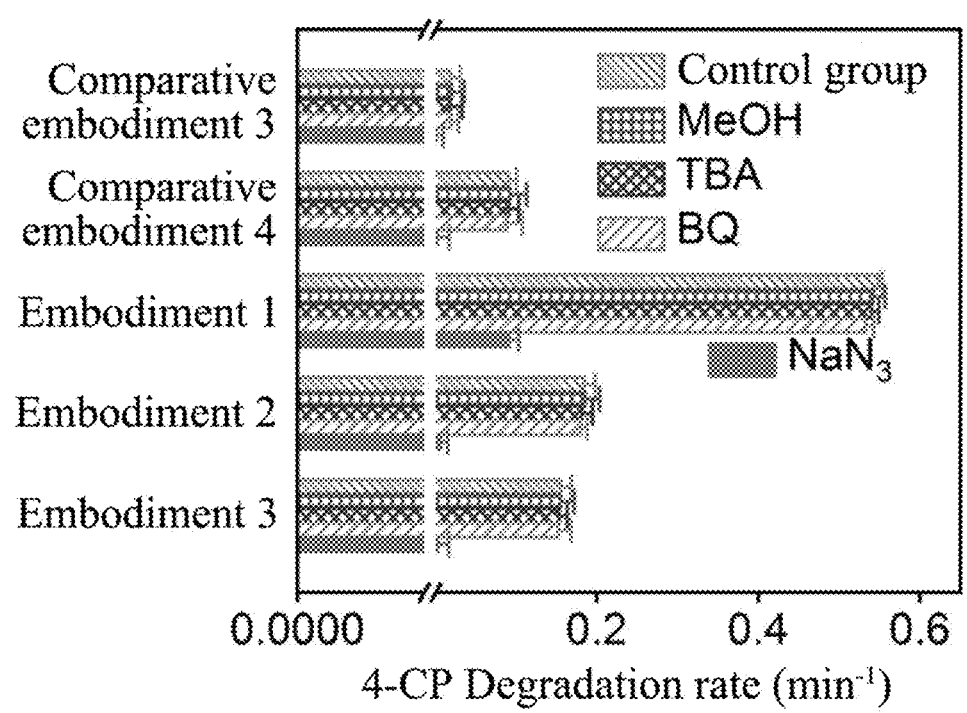
FIG. 15 is a diagram showing the results of capturing experiment of 4-CP degraded during the activation of PMS with 7.0% $Fe_1CN$ obtained in embodiment 1.

FIG. 14 is a diagram showing the degradation rate of 4-CP and the consumption rate of PMS under different SACs prepared in the present disclosure; FIG. 15 is a diagram showing the results of capturing experiment of 4-CP degraded during the activation of PMS with different $Fe_1CN$ prepared in the present disclosure. As can be seen from FIG. 14: a process of ligand anchoring-uniform assembly-high temperature pyrolysis was utilized to synthesize $Fe_1CN$ with different loading capacities controllably; when the loading capacity was 7 wt %, the degradation rate and the consumption rate of PMS were the most rapid; when quenching agents such as methyl alcohol (MeOH), tert-butyl alcohol (TBA) and BQ were added, the degradation rate was not affected; while when sodium azide ($NaN_3$) was added, the degradation process of 4-CP was significantly suppressed greatly (FIG. 15), indicating that $Fe_1CN$ was highly selective in generating $^1O_2$.

Figure 16:
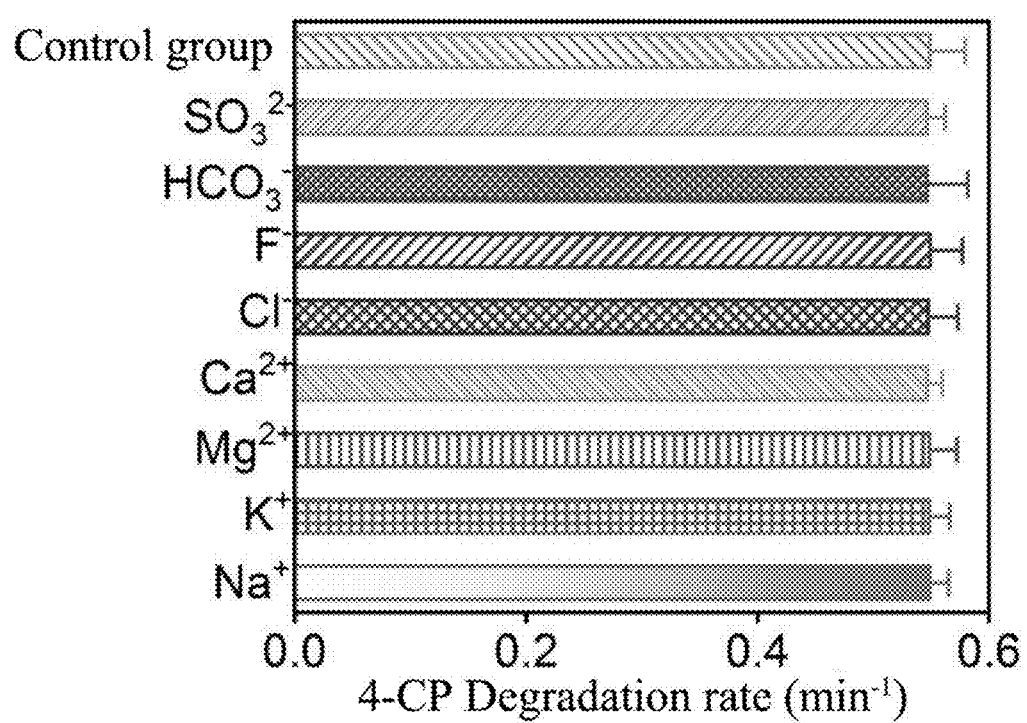
FIG. 16 is a diagram showing the influences of cations and anions when 4-CP is degraded during the activation of PMS with 7.0% $Fe_1CN$ obtained in embodiment 1.
Figure 17:
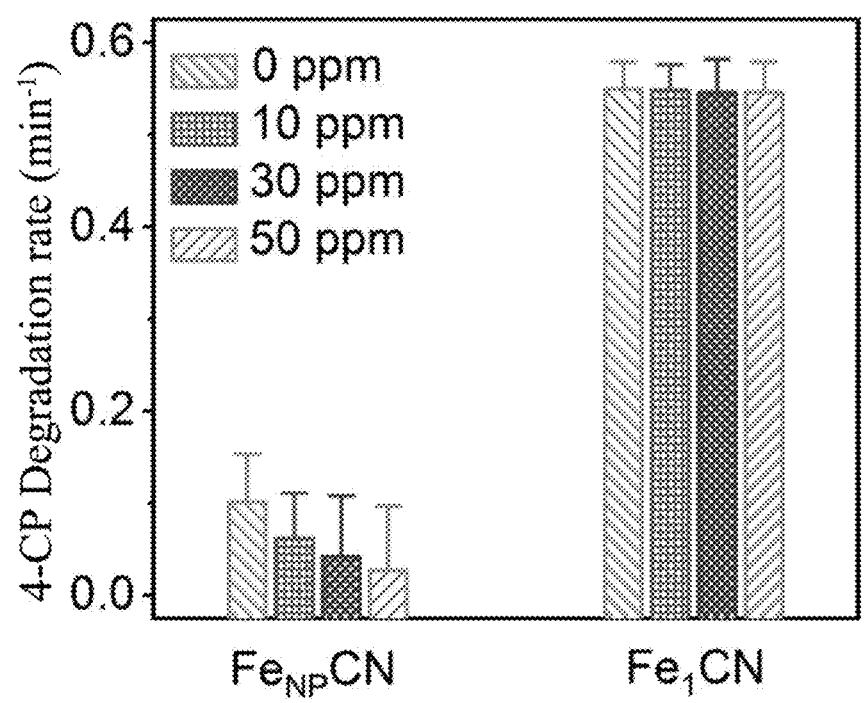
FIG. 17 is a diagram showing the influences on the degradation of different contents of natural organic matters (NOM) during the activation of PMS with 7.0% $Fe_1CN$ obtained in embodiment 1.
Figure 18:
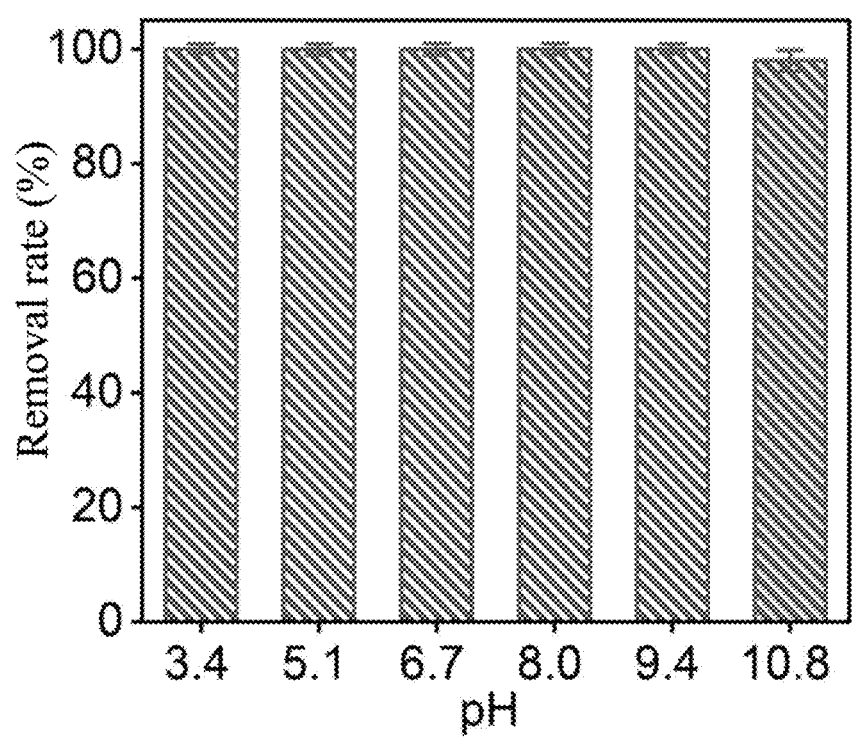
FIG. 18 is a diagram showing the influences of different pH values when 4-CP is degraded during the activation of PMS with 7.0% $Fe_1CN$ obtained in embodiment 1.
Figure 19:
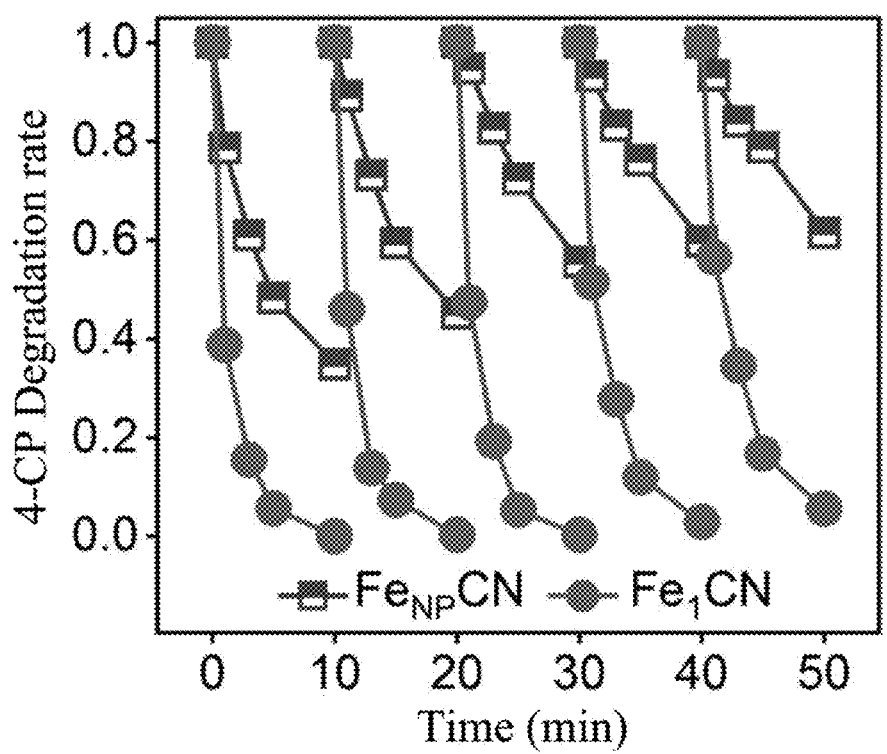
FIG. 19 is a diagram showing the periodic experiment of 4-CP degradation during the activation of PMS with 7.0% $Fe_1CN$ obtained in embodiment 1.

FIG. 16 is a diagram showing the influences of cations and anions when 4-CP is degraded during the activation of PMS with 7.0% $Fe_1CN$ obtained in embodiment 1; FIG. 17 is a diagram showing the influences on the degradation of different contents of natural organic matters (NOM) during the activation of PMS with 7.0% $Fe_1CN$ obtained in embodiment 1; FIG. 18 is a diagram showing the removal rates at different pH values when 4-CP is degraded during the activation of PMS with 7.0% Fe$_1$CN obtained in embodiment 1; FIG. 19 is a diagram showing the periodic experiment of 4-CP degradation during the activation of PMS with 7.0% Fe$_1$CN obtained in embodiment 1. In the actual water body, cations, anions and NOM are permanent. It was found from FIGS. 16 and 17 that, the catalytic degradation of organic pollutants by PMS activated with 7.0% Fe$_1$CN had a good anti-interference ability against cations, anions and NOM. Within a wide pH range (3-11), the removal rate of 4-CP by 7.0% Fe$_1$CN remained at 100% (FIG. 18), indicating that the generated pure $^1O_2$ had excellent adaptive capability to pH. The periodic experiment (FIG. 19) showed that 7.0% Fe$_1$CN exhibited better stability than 7.0% Fe$_{NP}$CN. The above results confirmed that 7.0% Fe$_1$CN had a good anti-interference ability against cations, anions and NOM, an extensive pH tolerance and a good stability.

Fe$_1$CN prepared in the present disclosure is used to activate PMS for the degradation of organic pollutants. It was found through qualitative and quantitative analysis on active substances that: the activation of PMS with Fe$_1$CN realized the efficient generation of pure $^1O_2$ active substances, allowing them to have the features of high efficiency, strong anti-interference ability against cations, anions and NOM, extensive pH tolerance range and a good stability during the degradation of aromatic organic pollutants.

Fe$_1$CN of the present disclosure has the following benefits: 1. The loading capacity of Fe single atoms is high, which is 7-12% the mass of the single-atom catalyst; 2. the activation of PMS generates pure $^1O_2$; 3. high catalytic degradation efficiency, strong anti-interference ability and good stability, especially 7.0% Fe$_1$CN prepared in embodiment 1 has an excellent catalytic degradation efficiency. This work provides a model for high efficient treatment of organic pollutants and waste water.

The foregoing is only preferable implementation of the present disclosure. It should be noted to persons with ordinary skills in the art that several improvements and modifications can be made without deviating from the principle of the present disclosure, which are also considered as the protection scope of the present disclosure.

The invention claimed is:

1. A single-atom catalyst for activation of persulfate to generate pure singlet oxygen, comprising supports and single iron atoms loaded on the supports; wherein the supports are graphitic carbon nitride nanosheets; the single iron atoms are bound to the supports in the form of a Fe—N$_4$ coordination structure; and the mass of the single iron atoms is 7-8% the mass of the single-atom catalyst, wherein no Fe nanoparticles or clusters are present in the single atom catalyst.

2. A method for preparation of a single-atom catalyst for activation of persulfate to generate pure singlet oxygen, comprising supports and single iron atoms loaded on the supports; wherein the supports are graphitic carbon nitride nanosheets; the single iron atoms are bound to the supports in the form of a Fe—N4 coordination structure; and the mass of the single iron atoms is 7-8% the mass of the single-atom catalyst, wherein no Fe nanoparticles or clusters are present in the single atom catalyst, the method comprising the following steps:
   organic acid ligands, soluble iron salts and water are mixed for a complexing reaction, to get a solution of iron-organic complexes;
   the solution of iron-organic complexes, cyanuric acid and cyanamide compounds are mixed for a self-assembly reaction to get precursors; and
   the precursors are pyrolyzed, to get the single-atom catalyst for activation of persulfate to generate pure singlet oxygen.

3. The preparation method according to claim 2, wherein, the organic acid ligands comprise one or more of oxalic acid, ethylenediamine tetraacetic acid and citric acid.

4. The preparation method according to claim 2, wherein, the mass ratio of the organic acid ligands to the soluble iron salts is (0.2-1.0):(0.05-1.0).

5. The preparation method according to claim 3, wherein, the mass ratio of the organic acid ligands to the soluble iron salts is (0.2-1.0):(0.05-1.0).

6. The preparation method according to claim 2, wherein, the cyanamide compounds comprise melamine and/or dicyandiamide.

7. The preparation method according to claim 2, wherein, the sum of the amount of carboxyl groups in the organic acid ligands and the amount of hydroxyl groups in cyanuric acid equals to the amount of amino groups in the cyanamide compounds.

8. The preparation method according to claim 6, wherein, the sum of the amount of carboxyl groups in the organic acid ligands and the amount of hydroxyl groups in cyanuric acid equals to the amount of amino groups in the cyanamide compounds.

9. The preparation method according to claim 2, wherein, the temperature of pyrolysis is 500-900° C., the time of pyrolysis is 2-8 h, and the pyrolysis is carried out in a protective atmosphere.

10. An application of the single-atom catalyst for activation of persulfate to generate pure singlet oxygen according to claim 1 in the catalytic degradation of organic pollutants, wherein such application comprising the following step: the single-atom catalyst for activation of persulfate to generate pure singlet oxygen, persulfate and organic pollutants to be treated are mixed for organic pollutants degradations, wherein the organic pollutants are selected from one or more of p-chlorophenol, phenol, bisphenol A and sulfamethoxazole.

* * * * *